United States Patent
Osborne

(10) Patent No.: US 9,611,178 B1
(45) Date of Patent: Apr. 4, 2017

(54) REGENERATIVE BURNERS HAVING ENHANCED SURFACE AREA MEDIA

(71) Applicant: Brian Osborne, Arnold, MO (US)

(72) Inventor: Brian Osborne, Arnold, MO (US)

(73) Assignee: O'Brien Asset Management, Saint Louis, MO (US)

( * ) Notice: Subject to any disclaimer, the term of this patent is extended or adjusted under 35 U.S.C. 154(b) by 0 days.

(21) Appl. No.: 14/859,515

(22) Filed: Sep. 21, 2015

(51) Int. Cl.
*B01J 19/30* (2006.01)
*C04B 35/10* (2006.01)
*F28D 19/02* (2006.01)

(52) U.S. Cl.
CPC .............. *C04B 35/10* (2013.01); *F28D 19/02* (2013.01); *C04B 2235/3201* (2013.01); *C04B 2235/3208* (2013.01); *C04B 2235/3217* (2013.01); *C04B 2235/3232* (2013.01); *C04B 2235/3272* (2013.01); *C04B 2235/3418* (2013.01)

(58) Field of Classification Search
CPC ........ B01J 19/30; F28D 19/02; F28D 17/005; C04B 35/10
See application file for complete search history.

(56) References Cited

U.S. PATENT DOCUMENTS 4,333,893 A * 6/1982 Clyde .................... B01J 16/005
210/150

* cited by examiner

*Primary Examiner* — Alexander Thomas
(74) *Attorney, Agent, or Firm* — C. John Brannon; Brannon Sowers & Cracraft PC

(57) ABSTRACT

A high strength ceramic body for use in a regenerative burner media bed, comprising a generally cylindrical portion and a plurality of generally orthorhombic parallelepiped-shaped fin portions extending radially from the generally cylindrical portion The ceramic body has a porosity of less than 1 percent, is greater than 99 weight percent alumina, has a thermal conductivity at 100° C. of about 0.07 cal/sec cm ° C., and has a heat capacity of about 0.21 cal/gm/° C.

13 Claims, 4 Drawing Sheets

REGENERATIVE BURNERS HAVING ENHANCED SURFACE AREA MEDIA

TECHNICAL FIELD

The claimed technology relates generally to ceramic materials and, more particularly, to shaped alumina media bed material for absorbing and releasing heat during sequential burner operation.

BACKGROUND

Regenerative burners are commonly used in molten aluminum, steel reheat, forging and glass furnaces. Regenerative burners typically include a pair of independently functioning burner units connected by a system of valves which allow each unit to alternately function as a burner and as a flue for the other unit when functioning as a burner. Cycle times between burner and flue functions may be as short as 30 seconds or so. The advantage of regenerative burners is that one unit captures the heat of the escaping flue gas of the other burner and uses the captured heat to warm a bed of thermal media which in turn pre-heats incoming combustion air, thus reducing fuel consumption as well as emissions.

However, as the burner units typically reach temperatures of 1500 degrees Fahrenheit of more during routine operation, and the incoming air is typically at ambient temperature, the rapid cycling of the bed media makes thermal shock damage to the media problematic. Further, heat recovery from the media is a function of the heat transfer, heat capacity, and effective surface area of the media. It is therefore advantageous for bed media to transfer heat quickly and efficiently to and from the surrounding gasses to minimize thermal shock as well as to most efficiently use the heat of flue gas to preheat incoming air.

The media size and shape also directly impact the pressure drop or resistance to gas flow through the media bed. Orientation of the media, shape, surface area, and void fractions all impact the pressure drop.

Another problem with standard spherical bed media is the rapid build-up of contamination on the surface of the media. Contaminants of the media from the flue gas, from the melting of painted metals and the like, build up on the media surfaces and interfere with their ability to efficiently transfer heat, reduce air flow and increase pressure drop thus requiring frequent cleaning and change-outs of the bed media.

Thus, there is a need for inexpensive heat exchange media having good thermal mass, heat transfer properties, and mechanical stability that will not contribute excessively to pressure drop. The present novel technology addresses this need.

DESCRIPTION OF THE PREFERRED EMBODIMENTS

Figure 1:
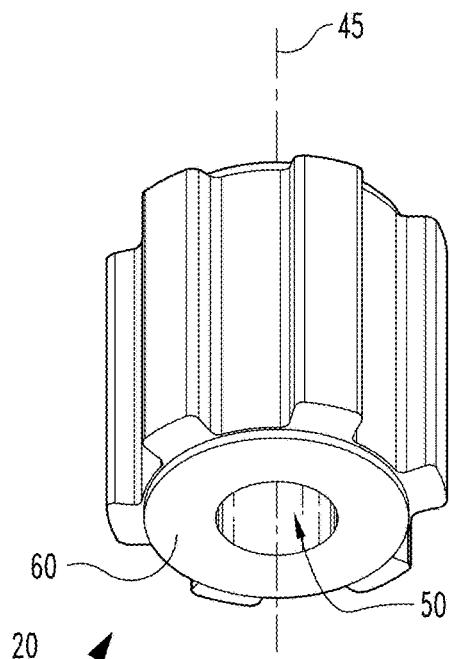
FIG. 1 is a perspective view of a first embodiment regenerative burner body of the present novel technology.

For the purposes of promoting an understanding of the principles of the claimed technology and presenting its currently understood best mode of operation, reference will now be made to the embodiments illustrated in the drawings and specific language will be used to describe the same. It will nevertheless be understood that no limitation of the scope of the claimed technology is thereby intended, with such alterations and further modifications in the illustrated device and such further applications of the principles of the claimed technology as illustrated therein being contemplated as would normally occur to one skilled in the art to which the claimed technology relates.

Figure 2:
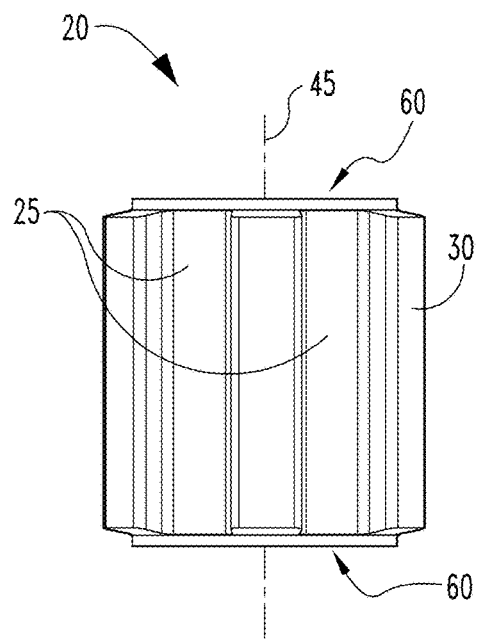
FIG. 2 is a side elevation view of FIG. 1.
Figure 3:
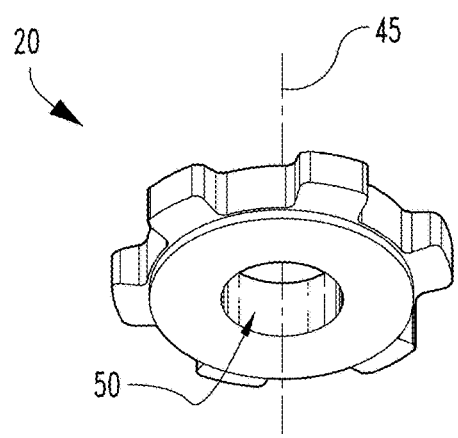
FIG. 3 is a perspective view of a second embodiment regenerative burner body of the present novel technology.
Figure 4:
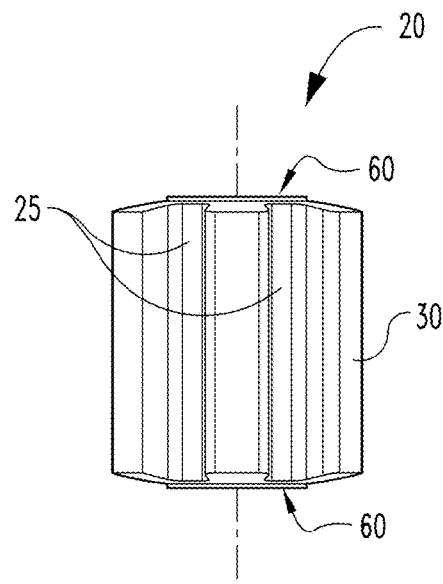
FIG. 4 is a side elevation view of FIG. 3.
Figure 5:
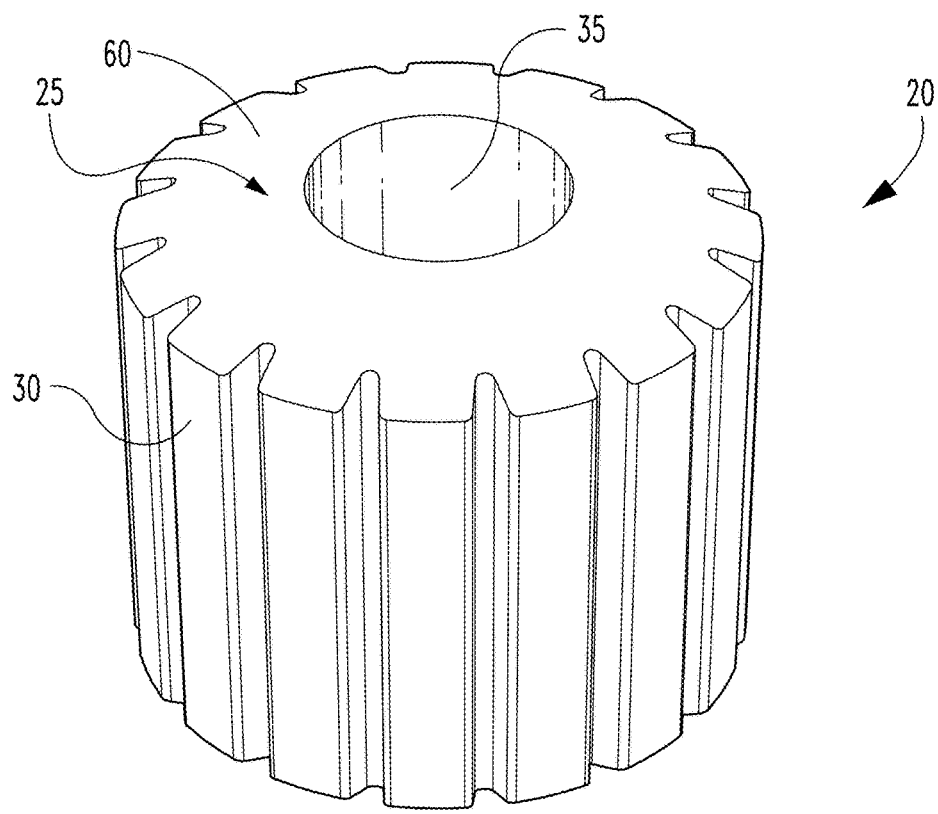
FIG. 5 is a perspective view of a third embodiment regenerative burner body of the present novel technology.
Figure 6:
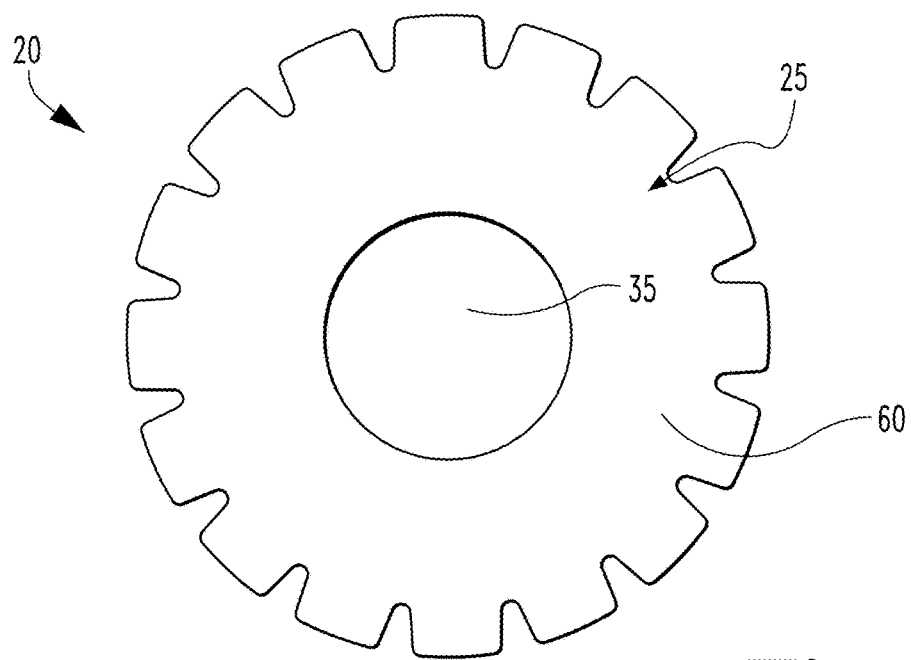
FIG. 6 is a side elevation view of FIG. 5.
Figure 7:
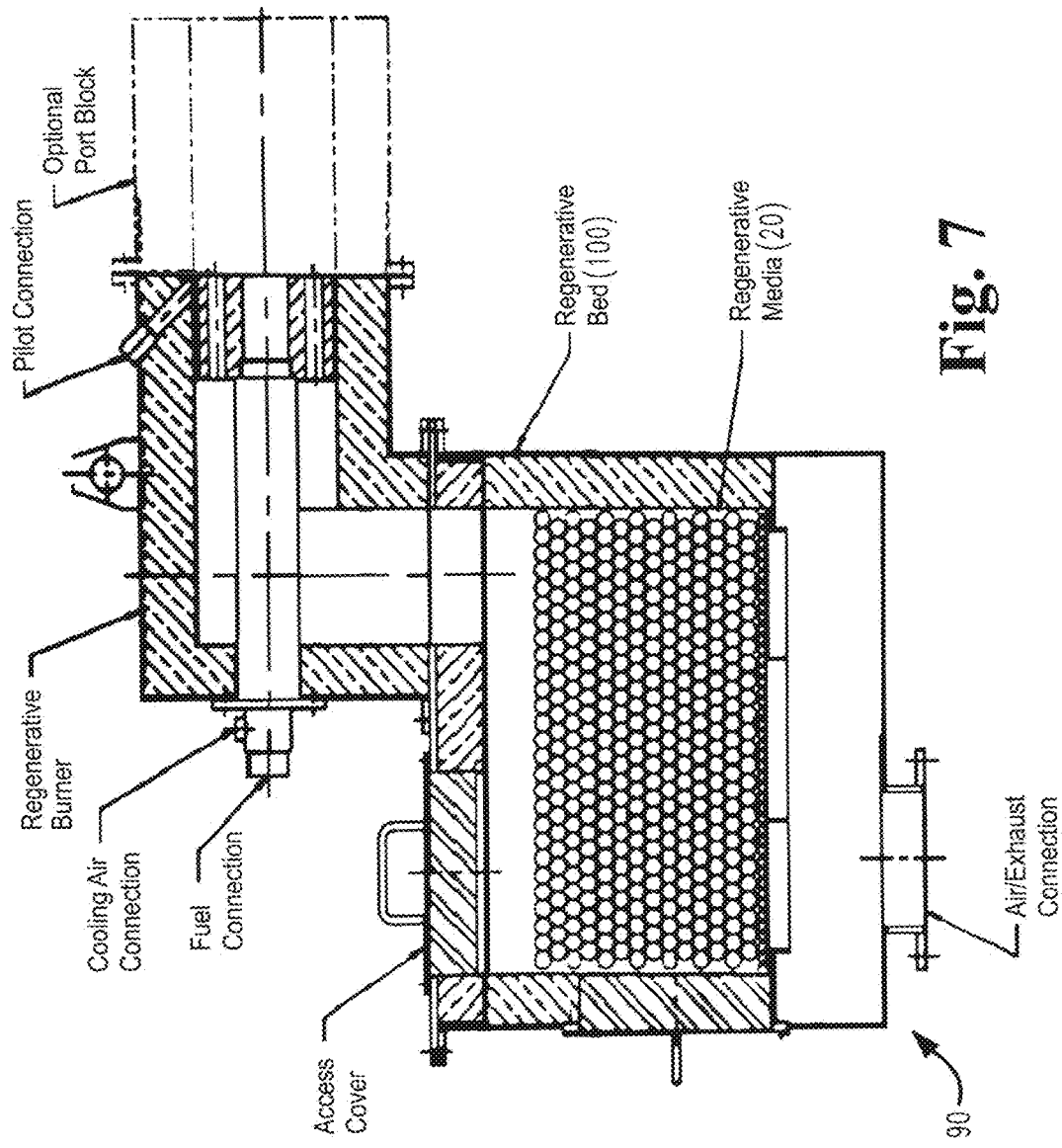
FIG. 7 schematically illustrates a regenerative burner system using the bodies of FIG. 1.
Figure 8:
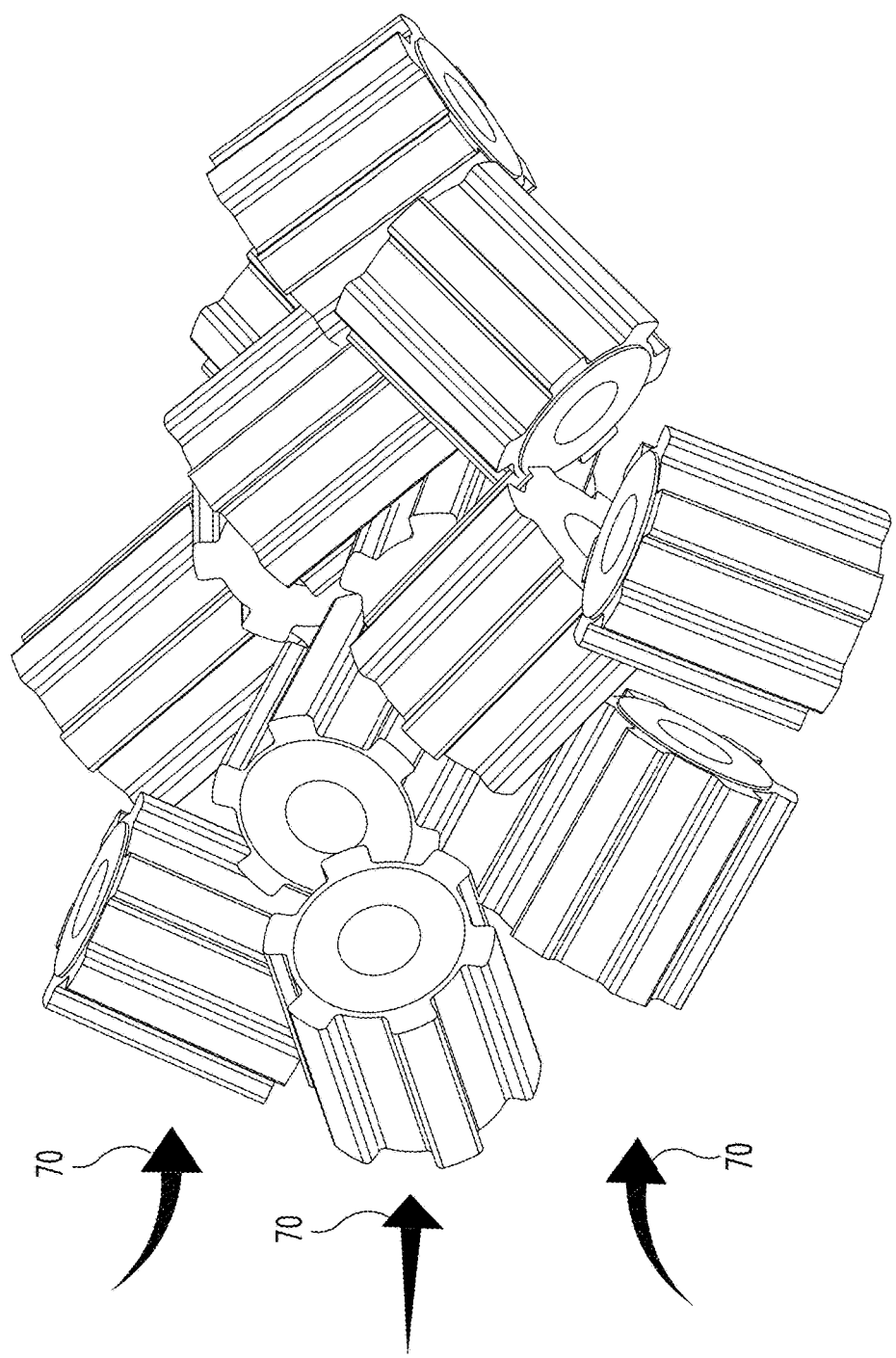
FIG. 8 is a schematic view of a plurality of intersecting bodies of FIG. 1.

As shown in FIGS. 1-8, the novel technology described and claimed herein relates to generally cog-shaped, typically alumina, refractory media 20 for use as heat absorbing/heat releasing bed material in a regenerative burner system. In general, the invention relates to regenerative burners having a dual burner design, wherein the hot exhaust from the currently active burner is directed onto media comprising the air inlet of the currently idle burner, so as to heat the media. When the active burner is idled and the idled burner is activated, inlet air is preheated by passage through the hot media, and the hot exhaust of the now active burner is directed over inlet port media of the now idled burner. The system includes cog-shaped media 20 instead of prior spherical media to afford increased surface area for heat transfer, reduced pressure drop (or equivalent pressure drop with smaller media yielding faster heat transfer), and ease of cleaning.

Each media body 20 includes a central portion 25 from which a plurality of vanes or fin members 30 extend. The central portion 25 is typically disc shaped or cylindrical, with elongated flutes or fins 30 extending outwardly therefrom. The central portion 25 typically has a circular cross-sectional shape. The fins 30 are typically positioned equidistantly around the diameter of the central portion 25, and are connected to the central portion 25 along substantially its entire length and extend perpendicularly outwardly therefrom.

The bodies 20 typically include a pair of central bore depressions 40, a respective depression 40 positioned in the center of either respective end of the cylindrical central portion 25, such that the major axis 45 of the cylindrical central portion 25 intersects both central bore depressions 40. In some embodiments, the bore depressions 40 intersect to define an axial tunnel 50 formed through the cylindrical portion 25.

The bodies 20 typically have the shape of a winged cylinder (a cylindrical central portion 25 having a plurality of generally orthorhombic fins or walls 30 extending axially therefrom), although larger bodies 20 may have central portions 20 having prolate spheroidal shapes, giving the bodies 20 the overall general shape of a truncated American football with symmetrically positioned fins 30 protruding therefrom.

The fins 30 and axial tunnels 50 function as collection points for contaminants borne by the flue gasses, extracting the contaminants from the flue gasses to prevent them from passing further through the beds. This allows the remainder of the bodies 20 making up the bed to remain cleaner longer, delaying the gradual increase in pressure drop and loss of efficiency of the heat transfer process, and thus extending the time between bed cleanings/change-outs.

The aspect ratio of diameter to height of the central cylinder 25 is between about 1:1.2 and about 1:1.5, with the aspect ratio of diameter of the overall body 20 is between about 1:1 and about 1:1.5 (or 2:3), although any desired aspect ratio may be selected. In some embodiments, such as the smaller bodies 20, the opposing ends 60 are flat, while in other embodiments, such as the larger bodies, the opposing ends are 60 slightly convex.

The bodies 20 are typically ≥99.0 weight percent alumina, and sometimes as much as 99.5 weight percent alumina or more, with the remainder being between about 0.1 and about 0.5 weight percent silica, iron oxide, titania, calcia and soda, although other compositions may be selected. In some compositions, the alumina content may range from about 60 weight percent to 90 weight percent, with the remainder typically being silica with smaller amounts of other oxides, and in other compositions, the alumina content may be 30 weight percent or less.

The water absorptions and porosity are typically about 1 weight percent or less, may typically be as great as about 3 weight percent. In some embodiments, the water absorption and porosity may be around 20 weight percent or more.

The bodies 20 typically have a relatively high heat capacity (about 0.21 cal/gm/° C. at 20° C.) and thermal conductivity (0.07 cal/sec cm ° C. at 100° C.), but also a relatively high thermal expansion coefficient. To minimize thermal shock damage, the bodies 20 are typically characterized with a very homogeneous microstructure.

In use, the bodies 20 are loaded into a burner 90 to define a regenerative bed 100. The media bodies 20 are typically of a single size, but alternately may be provided in a blend of sizes, or in layers. The fins 30 of respective bodies 20 rest against the fins 30 of other bodies 20, providing a contiguous network of air passageways 70 defining a predetermined minimum amount of void space so as to provide a reduced and controlled pressure drop across the bed 100.

Example 1

A small regenerative media body 20 was fabricated having a height along the major axis 45 of seventeen (17) millimeters, a central cylinder diameter of twelve (12) millimeters and an overall diameter of seventeen (17) millimeters. The fins 30 are each five (5) millimeters wide and extend five (5) millimeters from the cylindrical portion 25. An axial void shaft 40 was formed through the body along the major axis 45 having a diameter of six and a half (6.5) millimeters. The body 20 includes six (6) equidistantly spaced fins 30 extending two and a half (2.5) millimeters from the cylinder portion 25, each fin having a length of seventeen (17) millimeters parallel to the major axis 45. The composition of the body 20 was:

| | |
|---|---|
| $Al_2O_3$ | 99.0 wt. % |
| $SiO_2$ | 0.1 wt. % |
| $Fe_2O_3$ | 0.1 wt. % |
| $TiO_2$ | 0.4 wt. % |
| $Na_2O$ | 0.3 wt. % |
| CaO | 0.1 wt. % |

Example 2

A medium regenerative media body 20 was fabricated having a height along the major axis 45 of thirty-five (35) millimeters, a central cylinder diameter of thirty-one (31) millimeters and an overall diameter of forty-two (42) millimeters. An axial void shaft 40 was formed through the body along the major axis 45 having a diameter of sixteen (16) millimeters. The body 20 includes six (6) equidistantly spaced fins 30 extending five (5) millimeters from the cylinder portion 25, each fin having a length of thirty-five (35) millimeters parallel to the major axis 45. The composition of the body 20 was:

| | |
|---|---|
| $Al_2O_3$ | 99.0 wt .% |
| $SiO_2$ | 0.2 wt. % |
| $Fe_2O_3$ | 0.1 wt. % |
| $TiO_2$ | 0.4 wt. % |
| $Na_2O$ | 0.2 wt. % |
| CaO | 0.1 wt. % |

Example 3

A large regenerative media body 20 was fabricated having a height along the major axis 45 of eighty (80) millimeters, a central cylinder diameter of eighty-five (85) millimeters and an overall diameter of ninety-five (95) millimeters. The regenerative body 20 has a generally truncated prolate spheroid shape. An axial void shaft 40 was formed through the body along the major axis 45 having a diameter of thirty-five (35) millimeters. The body 20 includes sixteen (16) equidistantly spaced fins 30 extending five and a half (5.5) millimeters from the cylinder portion 25, each fin having a length of eighty (80) millimeters parallel to the major axis 45. The composition of the body 20 was:

| | |
|---|---|
| $Al_2O_3$ | 99.5 wt. % |
| $SiO_2$ | 0.10 wt. % |
| $Fe_2O_3$ | 0.05 wt. % |
| $TiO_2$ | 0.15 wt. % |
| $Na_2O$ | 0.15 wt. % |
| CaO | 0.05 wt. % |

While the claimed technology has been illustrated and described in detail in the drawings and foregoing description, the same is to be considered as illustrative and not restrictive in character. It is understood that the embodiments have been shown and described in the foregoing specification in satisfaction of the best mode and enablement requirements. It is understood that one of ordinary skill in the art could readily make a nigh-infinite number of insubstantial changes and modifications to the above-described embodiments and that it would be impractical to attempt to describe all such embodiment variations in the present specification. Accordingly, it is understood that all changes and modifications that come within the spirit of the claimed technology are desired to be protected.

I claim:
1. A sintered, generally cylindrical ceramic body, comprising:
   a generally cylindrical portion defining a major axis; and
   a plurality of fin portions extending from the generally cylindrical portion;
   wherein the fin portions are positioned equidistantly around the cylindrical portion;
   wherein the fin portions extend radially outwardly from the cylindrical portion;

wherein the body has an alumina content of at least about 99 weight percent distributed substantially homogeneously therethrough;

wherein the body has a silica content of between about 0.1 and 0.3 weight percent distributed substantially homogeneously therethroughout;

wherein the body has a titania content of between about 0.1 and 0.5 weight percent distributed substantially homogeneously therethroughout;

wherein the body has a calcia content of between about 0.05 and 0.2 weight percent distributed substantially homogeneously therethroughout;

wherein the body has a soda content of between about 0.1 and 0.5 weight percent distributed substantially homogeneously therethroughout;

wherein the body has an iron oxide content of between about 0.05 and 0.2 weight percent distributed substantially homogeneously therethroughout;

wherein the body has a porosity of less than 3 percent;

wherein the body has a thermal conductivity at 100° C. of about 0.07 cal/sec cm ° C.; and wherein the body has a heat capacity of about 0.21 cal/gm/° C.

2. The sintered body of claim 1 wherein the body has a porosity of less than 1 percent.

3. The sintered body of claim 1 wherein the fin portions are generally orthorhombic parallelopipeds.

4. The sintered body of claim 1 herein the sintered body has a generally truncated prolate spheroid shape.

5. The sintered body of claim 1 and further comprising a hollow shaft running along the major axis.

6. The sintered body of claim 1 wherein the generally cylindrical body has a height measured parallel to the major axis and a diameter measured generally perpendicular to the major axis; and wherein the aspect ratio of the diameter to the height is between about 1:1 and about 2:3.

7. The sintered body of claim 6 wherein the height is about 17 millimeters and the diameter is about 17 millimeters.

8. A high strength ceramic body for use in a regenerative burner media bed, comprising a generally cylindrical portion and a plurality of generally orthorhombic parallelepiped-shaped fin portions extending radially from the generally cylindrical portion; wherein the ceramic body has a porosity of less than 1 percent; wherein the ceramic body is greater than 99.5 weight percent alumina; wherein the ceramic body has a thermal conductivity at 100° C. of about 0.07 cal/sec cm ° C.; and wherein the ceramic body has a heat capacity of about 0.21 cal/gm/° C.

9. The high strength ceramic body of claim 8 wherein the generally cylindrical body has a height measured parallel to the major axis and a diameter measured generally perpendicular to the major axis; and wherein the aspect ratio of the diameter to the height is between about 1:1 and about 2:3.

10. A plurality of refractory ceramic bodies for use as regenerative burner bed body, each respective body comprising:

a generally cylindrical portion defining a major axis;

a cylindrical aperture extending through the generally cylindrical portion and coextensive with the major axis; and a plurality of equidistantly positioned generally orthorhombic parallelepiped fin portions extending radially outwardly from the generally cylindrical portion;

wherein the refractory ceramic body has a height measured parallel to the major axis and a diameter measured generally perpendicular to the major axis; and wherein the aspect ratio of the diameter to the height is between about 1:1 and about 2:3.

11. The plurality of refractory ceramic bodies of claim 10 and further comprising a contiguous network of air passageways.

12. The plurality of refractory ceramic bodies of claim 11 wherein intersection of respective fins of respective bodies defines the contiguous network of air passages.

13. The plurality of refractory ceramic bodies of claim 11 wherein respective cylindrical apertures and intersection of respective fins of respective bodies defines the contiguous network of air passages.

* * * * *